United States Patent [19]

Fatchett

[11] Patent Number: 5,403,068

[45] Date of Patent: Apr. 4, 1995

[54] VEHICLE SEAT FRAME

[75] Inventor: Robert P. Fatchett, Warsaw, Ind.

[73] Assignee: Haimbaugh Enterprises, Inc., Warsaw, Ind.

[21] Appl. No.: 14,410

[22] Filed: Feb. 5, 1993

[51] Int. Cl.$^6$ .............................................. A47C 15/00
[52] U.S. Cl. .................................... 297/238; 297/367; 297/344.1
[58] Field of Search ............... 297/234, 235, 238, 254, 297/344.1, 363–366, 369, 376, 440.11, 440.2, 112

[56] References Cited

U.S. PATENT DOCUMENTS

| | | | |
|---|---|---|---|
| 3,784,252 | 1/1974 | Peterson | 297/364 |
| 4,125,288 | 11/1978 | Hunter | 297/369 |
| 4,721,337 | 1/1988 | Tomita | 297/344.1 X |
| 4,900,086 | 2/1990 | Steward | 297/238 |
| 4,900,087 | 2/1990 | Crisp | 297/238 |
| 5,161,855 | 11/1992 | Harmon | 297/238 |
| 5,211,446 | 5/1993 | Jay et al. | 297/440.2 X |

Primary Examiner—Kenneth J. Dorner
Assistant Examiner—Milton Nelson, Jr.
Attorney, Agent, or Firm—Lundy and Associates

[57] ABSTRACT

An improved vehicle seat frame having a back frame and a seat frame. The back frame and seat frame are hinged together. The back frame and seat frame are movable between an upright position and a reclining position. A latch is positioned between the upright and reclining positions which locks the vehicle seat in both its upright position and its reclining position from further movement both forwardly or rearwardly thereof.

23 Claims, 3 Drawing Sheets

VEHICLE SEAT FRAME

BACKGROUND OF THE INVENTION

This invention relates to vehicle seats, and more particularly to a vehicle seat frame which has particular usefulness in adult/child vehicle seats which can be used as either an adult vehicle seat or a vehicle seat for an infant, toddler or child weighing more than twenty pounds (hereinafter child vehicle seat), as desired.

Conventionally, vehicle seat frames are positioned on top of pedestals in a vehicle with conventional slide tracks positioned therebetween. Adult vehicle seats positioned in the front of vehicles are subject to a plurality of United States Government regulations which correctly position a passenger at specified distances from the dashboard, the side doors, roof, and the floor of the vehicle.

Child seats are also subject to a plurality of different regulations which include the positioning and the attitude and facing of the child within the vehicle. Infants of less than about twenty pounds must, according to these regulations, face rearwardly, and thus, are without the scope of this invention.

Additionally, both adult and child vehicle seat regulations in the past have comprised only front and rear collision regulations. Both have now been amended to include additional side impact and roll over regulations soon to become effective. These new regulations obsolete most vehicle infant and child seats and create a need for adult/child vehicle seats which pass all collision regulations, front, rear, side and roll over. Thus, the demand for an adult/child vehicle seat which can be utilized as an adult vehicle seat, but can be converted into a child vehicle seat when needed, bas arisen.

In some instances, the adult and child regulations are inconsistent. For example, the adult regulations allow for the seat to move from an upright position to a forward position. Only the upright position requires a latch to lock the seat in its upright position. Child regulations, on the other hand, may have in addition to the forward position, an upright position and a reclining position. Child seats must have a latch to lock the seat in each of its positions from both movement forwardly and rearwardly.

It is therefore highly desirable to provide an improved adult/child vehicle seat frame.

It is also highly desirable to provide an improved adult/child vehicle seat frame which meets all of the adult and child front, rear and side impact and roll over regulations.

It is also highly desirable to provide an improved adult/child vehicle seat frame which is simple in construction and is relatively easily manufactured.

It is also highly desirable to provide an improved adult/child vehicle seat frame which has a latch which locks the seat in each position in both forward and rearward directions.

It is also highly desirable to provide an improved adult/child vehicle seat frame which minimizes the total weight of the seat.

It is finally highly desirable to provide an improved adult/child vehicle seat frame which meets all of the above desired features.

SUMMARY OF THE INVENTION

It is therefore an object of the invention to provide an improved adult/child vehicle seat frame.

It is also an object of the invention to provide an improved adult/child vehicle seat frame which meets all of the adult and child front, rear and side impact and roll over regulations.

It is also an object of the invention to provide an improved adult/child vehicle seat frame which is simple in construction and is relatively easily manufactured.

It is also an object of the invention to provide an improved adult/child vehicle seat frame which has a latch which locks the seat in each position in both forward and rearward directions.

It is also an object of the invention to provide an improved adult/child vehicle seat frame which minimizes the total weight of the seat.

It is finally an object of the invention to provide an improved adult/child vehicle seat frame which meets all of the above desired features.

In the broader aspects of the invention there is provided an improved vehicle seat frame having a back frame and a seat frame. The back frame and seat frame are hinged together. The back frame and seat frame are movable between an upright position and a reclining position. A latch is positioned between the upright and reclining positions which locks the vehicle seat in both its upright position and its reclining position from further movement both forwardly or rearwardly thereof.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
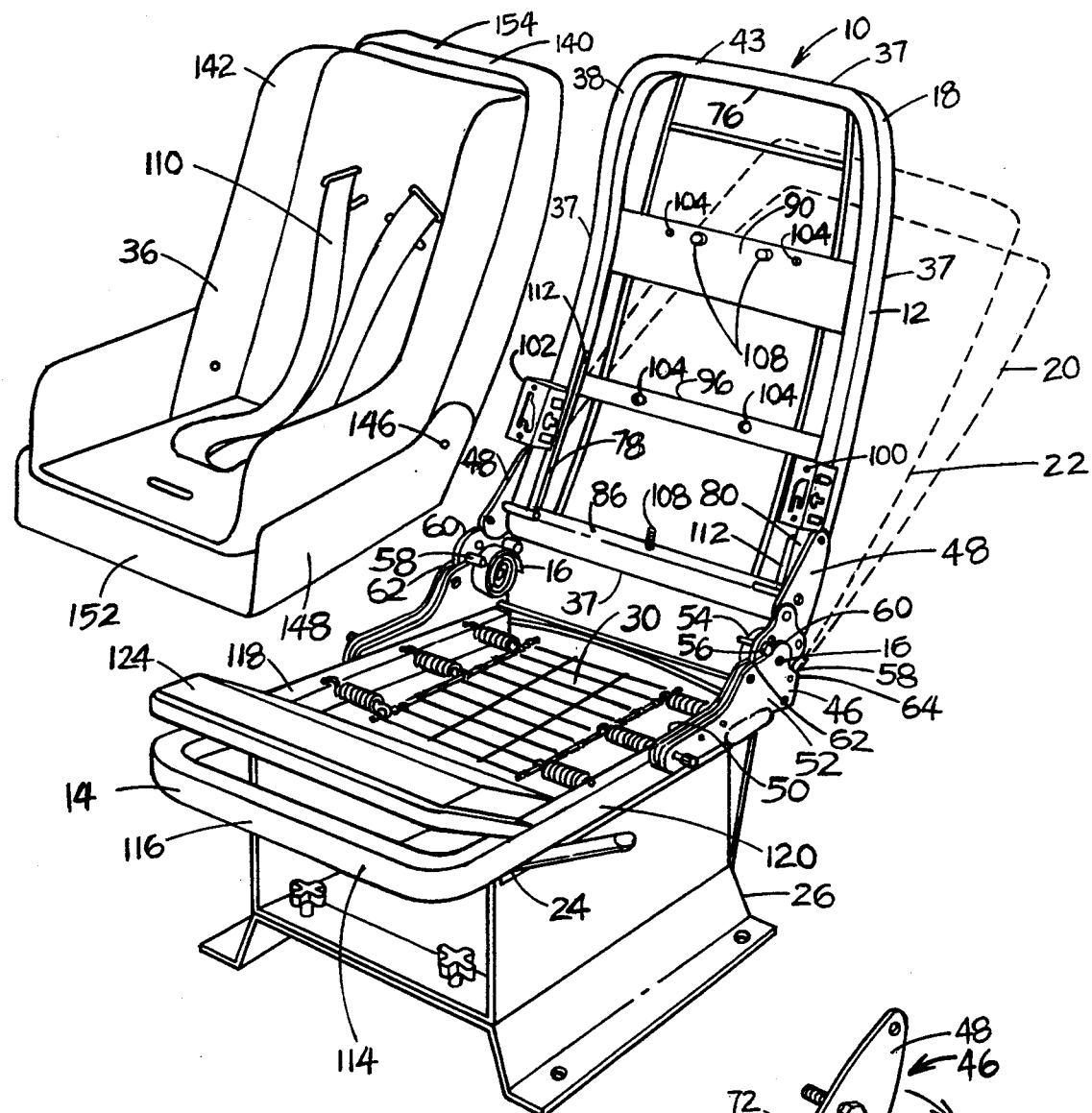
FIG. 1 is a perspective view of the improved vehicle seat frame of the invention showing the seat mounted on a conventional pedestal and motion slides.
Figure 2:
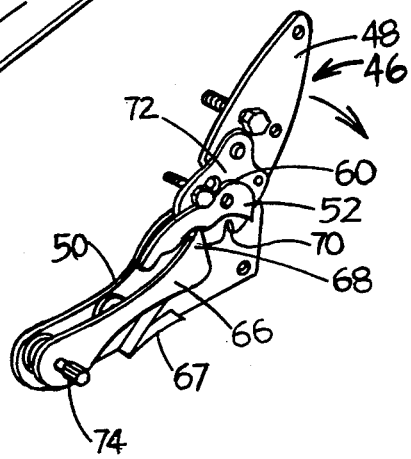
FIG. 2 is a perspective view of the latch of the improved vehicle seat frame of the invention with one bracket thereof broken away to show the ratchet and pawl of the latch.
Figure 3:
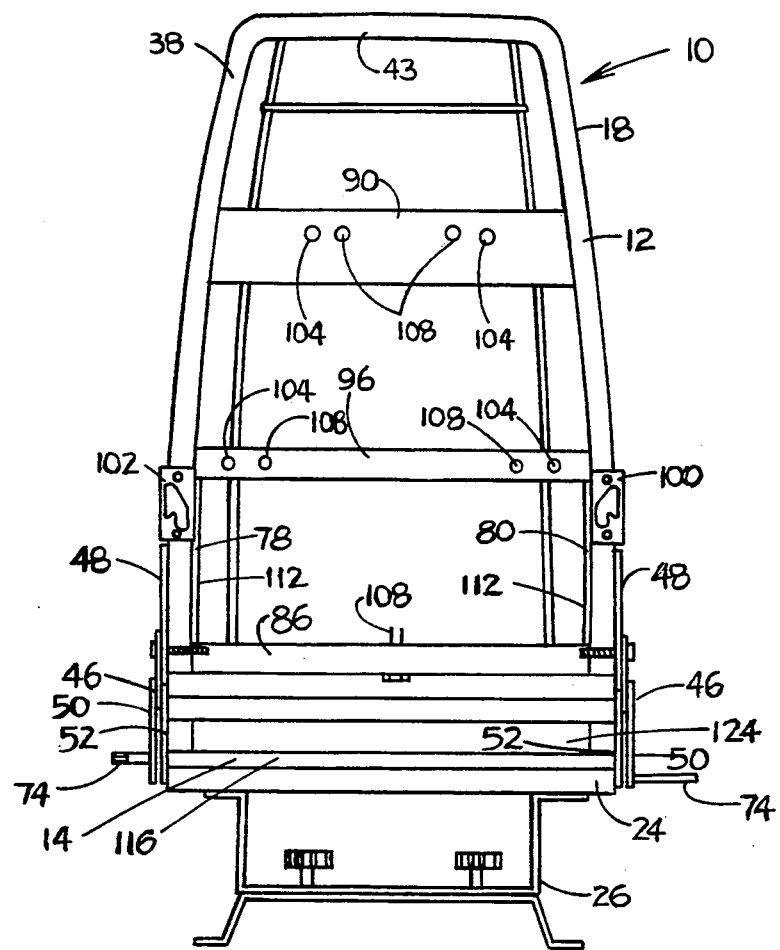
FIG. 3 is a front planar view of the improved vehicle seat frame of the invention shown in FIG. 1 with the upholstery and child seat removed for clarity.

The improved vehicle seat frame 10 of the invention provides an adult/child vehicle seat frame for a vehicle which can be used in both front and back, adult and child vehicle seats. Frame 10 has a back frame 12 and a seat frame 14. The back frame 12 and seat frame 14 are joined together by oppositely disposed pivot rods 16. The seat frame 14 and the back frame 12 are movable relative to each other between an upright position 18 and a reclining position 20 through one or more intermediate positions 22.

Seat frame 14 is secured to a conventional seat slide 24. Seat slide 24 is secured to a seat pedestal 26. In specific embodiments, seat pedestal 26 may be a conventional unitary pedestal or a conventional two-piece pedestal, the pieces of which can be removably locked together, thus, allowing the seat to be removed from the vehicle as desired.

Seat frame 14 has a cushion 28 which extends over the springs 30 and a cover 32 which secures the cushion 28 to the seat frame 14. Cover 32 is secured to the seat frame 14 at its peripheral frame member 114.

Back frame 12 has a child seat 36 secured to its midsection intermediate opposite peripheral portions 37 of its peripheral frame member 38. Peripheral portions 37 of the back frame 12 are spaced from the child seat 36 when secured to the back frame 12 on opposite sides thereof and above and below the child seat 36. Back cushion 40 is positioned to overlay the child seat 36.

Figure 4:
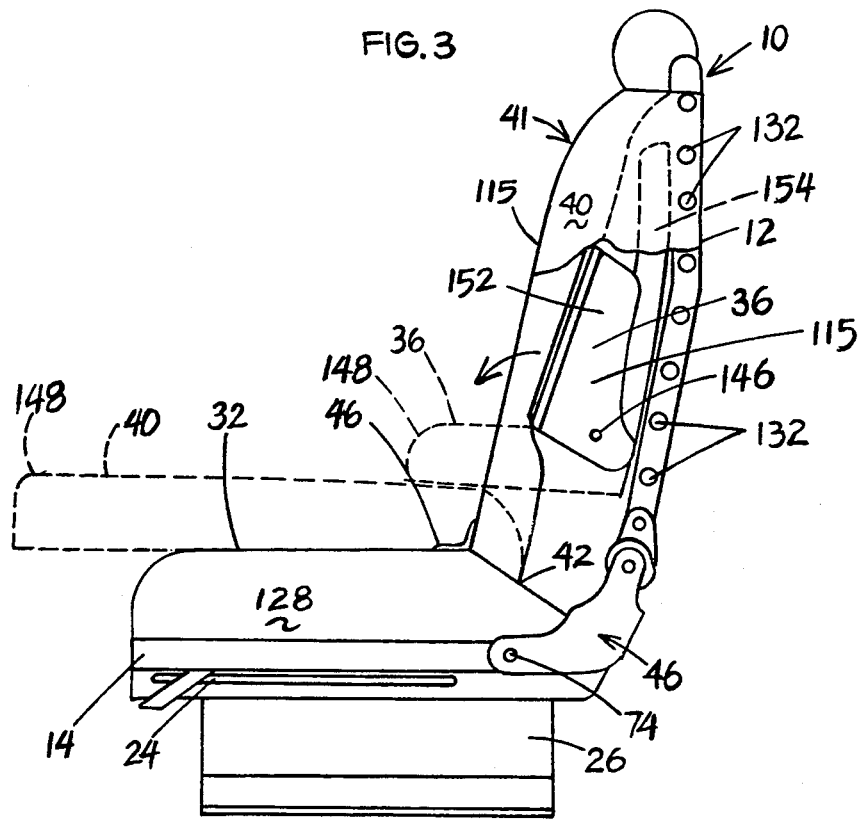
FIG. 4 is a side planar view showing the improved vehicle seat frame of the invention fully upholstered with the upholstery broken away and the child seat and the back seat cushion shown in two alternate positions in full and dashed lines.
Figure 5:
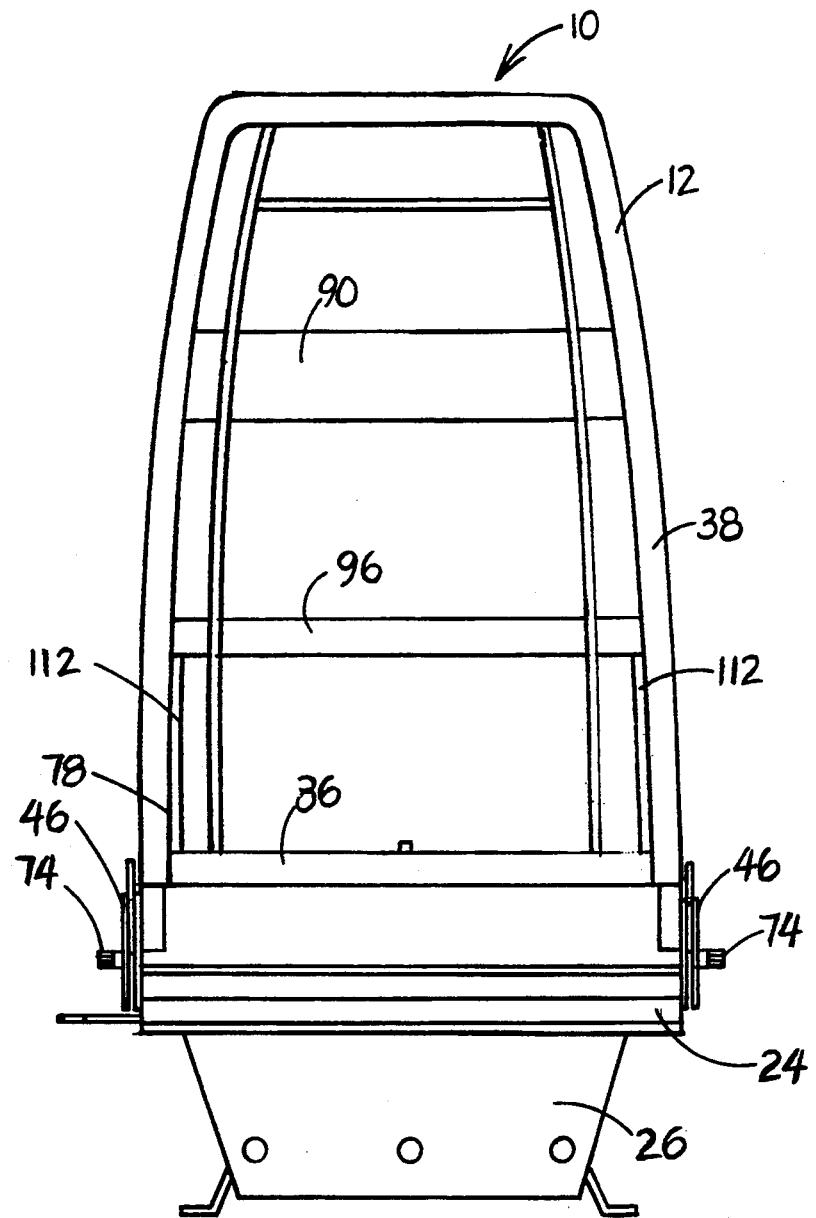
FIG. 5 is a rear planar view of the improved vehicle seat frame of the invention.

Cushion 40 is pivotally connected to the back frame 12 so as to be removable from the back frame 12 and expose child seat 36 when the child seat 36 is desirably used. FIG. 4 illustrates the back seat cushion 40 to be pivotally connected to the back frame 12 at its bottom 42 such that the back seat cushion 40 can be positioned over the child seat 36 (full lines in FIG. 4) or rotated about its pivot 44 to be positioned over seat cushion 28 (dashed lines in FIG. 4).

A latch 46 is provided between back frame 12 and seat frame 14 of vehicle seat frame 10 of the invention to releasably lock back frame 12 and seat frame 14 in its upright, intermediate and reclining positions such that unintended movement in both forward and backward directions is prohibited.

Latch 46 comprises a seat flange 48 secured to back frame 12 and a pair of spaced apart seat brackets 50, 52 secured to seat frame 14. Seat flange 48 is positioned between the seat brackets 50, 52. Flange 48 and seat brackets 50, 52 each have a hole 54 extending therethrough in which a pivot rod 16 is positioned. Additionally, flange 48 has two stops 56 and 58 thereon which extend outwardly of flange 48 and rotate about pivot rod 16 with flange 48. Brackets 50, 52 have an arcuate peripheral boundary 60 terminated at the opposite ends thereof by stops 62 and 64 against which stops 56 and 58 abut in the upright and reclining positions of back frame 12 and seat frame 14 of the invention.

A latch plate 66 is positioned between brackets 50, 52 which has a pawl 68 which engages the teeth 70 of a ratchet 72 corresponding to each of the intermediate positions of the frame 12, 14. The ratchet 72 and pawl 68 are actuated by a pin 74 which is moved inwardly/outwardly against the urging of spring 67 to retract or extend pawl 68 and engage pawl 68 and teeth 70 of ratchet 72 to lock frames 12, 14 in their desired positions.

Back seat frame 12 has a peripheral frame member 38 which has a top edge 76 and spaced apart bottom portions 78, 80 to which the brackets 48 are secured. Peripheral frame member 38 has a lower cross bar 86 secured to and extending horizontally between opposite portions 78, 80 adjacent to flanges 48. An upper cross member 90 is secured adjacent to top edge 76 between opposite portions 78, 80. An intermediate cross member 96 is secured between opposite portions 78, 80 between lower and upper cross members 86, 90, respectively. Secured to peripheral frame member 38 adjacent intermediate cross member 96 is a pair of spaced apart arm bases 100, 102 to which arm rests (not shown) are secured.

Top 90 and intermediate 96 generally horizontal cross members have openings 104 therein through which bolts 106 are positioned to secure child seat 36 to back frame 12 between opposite portions 78, 80 of peripheral frame member 38. Upper 90, intermediate 96, and lower 86 cross members have openings 108 therein by which the harness 110 of the child seat 36 is secured so that when a child is in child seat 36, and harnass 110 is in position, harnass 110 holds the child within seat 36 and seat 36 to back seat frame 12 in addition to the attachment of seat frame 12 to child seat 36.

In a specific embodiment, peripheral frame member 38 is made of 14 gauge, one inch square steel tubing. Upper 90, lower 86, and intermediate 96 cross members are made of 14 gauge sheet steel. Brackets 50, 52 are made of 14 gauge sheet steel. In this same embodiment, reinforcing plates 112 are secured to peripheral frame member 38 extending from brackets 50, 52 to intermediate cross member 96. Reinforcing plates 112 allow seat frame 10 to pass all front, rear, side collision and rollover requirements for vehicle seats while utilizing a peripheral frame member 38 of one inch square steel tubing of 14 gauge rather than steel of larger size and heavier gauge.

Similarly, seat frame 14 of the improved vehicle seat frame 10 of the invention has a peripheral member 114, a front portion 116 and opposite side portions 118, 120 extending rearwardly. Adjacent rear ends 122 of opposite side portions 118, 120 are secured the spaced apart pair of seat brackets 50, 52 between which flanges 48 of back seat frame 14 are positioned and through which pivot rods 16 extend. Adjacent front portion 116, a front edge elevator 124 is secured between opposite portions 118, 120 of peripheral member 114. Extending between opposite portions 118, 120 rearwardly thereof is a set of conventional springs 30 on which seat frame cushion 28 is positioned. Elevator 124 adds to the rigidity of seat frame 14 and allows for seat frame 14 to properly position the body of its occupant in the vehicle seat of the invention.

In a specific embodiment, peripheral frame member 114 can be formed of 14 gauge, one inch square steel tubing and seat elevator 124 can be formed of 12 gauge sheet steel. Brackets 50, 52 and flanges 48 are formed of 14 gauge sheet steel. Pivot rods 16 are formed of ¼ inch diameter steel rod.

In a specific embodiment, a seat slide 24 is positioned between seat pedestal 26 and seat frame 10. Seat slide 24 can be either manually operated or motor operated by motor 25 as desired.

Both back frame 12 and seat frame 14 have cushions 28, 40 which overlay the structure above described. Back cushion 40 overlays child seat 36 and is removably secured to peripheral frame element 38.

Seat cushion 28 overlays seat elevator 124 and springs 30 and a fabric cover 32 overlays cushion 28. Fabric 32 is secured to peripheral frame member 114 as conventional in other upholstered seats.

Back seat cushion 40 is secured to back seat cushion fabric cover 41 and fabric cover 41 is secured to peripheral frame member 38 by removable fasteners 132, such as snaps, zippers, hook and loop fasteners, or the like, such that fasteners 132 can be detached and back seat frame cushion 40 and cover 41 can be placed in one of the positions illustrated in FIG. 4 exposing child seat 36.

In a specific embodiment, back seat cushion 40 overlays child seat 36 and is pressed between fabric cover 41 and child seat 36 by the tightness of fabric cover 41.

In specific embodiments, back seat cushion 40 may be supported by a rigid back plate (not shown) or supported over child seat 36 only by fabric cover 41 to which cushion 40 is attached as shown.

In the specific embodiment that a rigid back plate overlays child seat 36, back seat cushion 40 is secured to back plate, and fabric cover 41 is secured to cushion 40.

In all embodiments, the child seat will have a cushion 142 within the child seat in which a child will be placed. As is conventional, the cushion may be supplied in various thicknesses to accomodate toddlers and larger children as the child grows.

In all embodiments of the child seat 36, the seat portion is pivoted relative to the back portion about pivot 146 so that it can be moved between a down position 148 and an up position 115 as shown in FIG. 4. The up position 115 is defined by engagement of the child seat portion 152 and the back portion 154. The down position 148 is similarly defined by the engagement of the seat portion 152 and the back portion 154. Stops are positioned on both the seat portion and the back portion.

In specific embodiments, the improved vehicle seat frame 10 of the invention may have only an upright 18 and a reclining 20 position, or may have several intermediate positions 22 between its upright 18 and reclining 20 positions.

The improved seat frame 10 of the invention provides an improved vehicle seat which can be used for both adults and children in the front or rear of motor vehicles, is relatively easily manufactured, simple in construction, is locked by a removable latch, both in its forward and rearward positions and at all positions therebetween and which meets all of the front, rear and side collision and roll over regulations of the Federal Government.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A vehicle seat frame for an adult/child vehicle seat having a back frame and a seat frame, said back and seat frame being hinged together, said back and seat frame being movable relative to each other between an upright position and a reclining position, said seat frame having means thereon for securing said seat frame to a vehicle, said seat frame having means thereon for securing a seat cushion to said seat frame, a rigid child seat, said back frame having means for securing said child seat to said back frame with the boundaries of said back frame, a back cushion, means for connecting said back cushion to said back frame, at least a portion of said back cushion being movable from a position overlaying said child seat to a position exposing said child seat, a latch releasably locking said back frame and seat frame in both upright and reclining positions from movement therebetween, whereby said frame meets all front, rear and side collision standards for vehicle seats.

2. The vehicle seat frame of claim 1 wherein both said back frame and seat frame have a boundary element and interior elements extending between opposite portions of said boundary element, said child seat being secured to said interior elements.

3. The vehicle seat frame of claim 1 wherein said back cushion overlays said seat cushion when said child seat is exposed.

4. The vehicle seat frame of claim 1 wherein back cushion overlays the back of said back frame when said child seat is exposed.

5. The vehicle seat frame of claim 1 having at least one position between said upright and reclining positions.

6. The vehicle seat frame of claim 1 wherein said seat frame securing means allows for said seat frame to be secured to a seat pedestal with an adjustable seat slide therebetween.

7. The vehicle seat frame of claim 6 wherein said seat slide is manually operated.

8. The vehicle seat frame of claim 6 wherein said seat slide is motor operated.

9. The vehicle seat frame of claim 1 wherein said latch comprises a back latch plate secured to said back frame, a seat latch plate secured to said seat frame, said latch plates being generally parallel and spaced apart and overlapping when said seat and back frames are hinged together, said latch plates having a plurality of holes therein, two of which are concentric when said seat is in said upright and reclining positions, respectively, and a latch pin which is positioned in said holes when said seat is in said upright and reclining positions.

10. The vehicle seat frame of claim 9 wherein there is a pair of latch plates adjacent both sides of said frames and a latch pin for both pairs.

11. The vehicle seat frame of claim 1 wherein back cushion is removably attached to said back frame adjacent a boundary element by fasteners when said back cushion overlays said child seat.

12. The vehicle seat frame of claim 10 wherein said fasteners are chosen from the group of fasteners consisting of zippers, snaps, hook and loop strips, and other fasteners.

13. The vehicle seat frame of claim 1 wherein said child seat comprises a rigid seat portion and a rigid back portion pivoted together, said seat and back portions both having rigid, impact absorbing upstanding sides, said seat portion being movable relative to said back portion between an extended condition and a collapsed condition, said back cushion being movable to its overlaying position when said child seat is in said collapsed condition, said child seat being movable to its extended condition when said back cushion is in its exposing position.

14. The vehicle seat frame of claim 13 having a cushion within said rigid seat portion and rigid back portion, said cushion thickness being chosen to accommodate children chosen from the group consisting of toddlers and infants weighing more than 20 pounds.

15. A vehicle seat frame for an adult/child vehicle seat having a back frame and a seat frame, said back and seat frame being hinged together, said back and seat frame being movable between an upright position and a reclining position, said seat frame having means thereon for securing said seat frame to a vehicle, said seat frame also having means thereon for securing a seat cushion to said seat frame, a rigid child seat, said back frame having means for securing said child seat to said back frame within the boundaries of said back frame, a back cushion, means for connecting said back cushion to said back frame, at least a portion of said back cushion being movable from a position overlaying said child seat to a position exposing said child seat, a latch releasably locking said back frame and seat frame in both upright and reclining positions from movement therebetween, whereby said frame meets all front, rear and side collision standards for vehicle seats, said back frame and seat frame having a boundary element and interior elements extending between opposite portions of said boundary element, said child seat being secured to said interior elements, said seat frame securing means allowing for said seat frame to be secured to a seat pedestal with an adjustable seat slide therebetween.

16. The vehicle seat frame of claim 15 wherein said latch comprises a back latch plate secured to said back frame, a seat latch plate secured to said seat frame, said latch plates being generally parallel and spaced apart and overlapping when said seat and back frames are hinged together, said latch plates having a plurality of holes therein, two of which are concentric when said seat frame is in said upright and reclining positions, respectively, and a latch pin which is positioned in said holes when said seat frame is in said upright and reclining positions.

17. The vehicle seat frame of claim 16 wherein there is a pair of latch plates adjacent both sides of said frames and a latch pin for both pairs.

18. The vehicle seat frame of claim 17 wherein said back cushion overlays said seat cushion when said child seat is exposed.

19. The vehicle seat frame of claim 17 wherein said back cushion overlays the back of said back frame when said child seat is exposed.

20. The vehicle seat frame of claim 17 wherein said back cushion is removably attached to said back frame adjacent said boundary element by fasteners when said back cushion overlays said child seat.

21. The vehicle seat frame of claim 20 having at east one position between said upright and reclining positions.

22. The vehicle seat frame of claim 13 wherein said child seat comprises a rigid seat portion and a rigid back portion pivoted together, said seat and back portions both having rigid, impact absorbing upstanding sides, said seat portion being movable relative to said back portion between an extended condition and a collapsed condition, said back cushion being movable to its overlaying position when said child seat is in said collapsed condition, said child seat being movable to its extended condition when said back cushion is in its exposing position.

23. The vehicle seat frame of claim 22 having a cushion within said rigid seat portion and rigid back portion, said cushion thickness being chosen to accommodate children chosen from the group consisting of toddlers and infants weighing more than 20 pounds.

* * * * *